(12) United States Patent
Li et al.

(10) Patent No.: US 10,623,128 B2
(45) Date of Patent: Apr. 14, 2020

(54) APPARATUS AND METHOD FOR PROCESSING A FREQUENCY OFFSET OF A PILOT AND RECEIVER

(71) Applicant: Fujitsu Limited, Kawasaki-shi, Kanagawa (JP)

(72) Inventors: Huihui Li, Beijing (CN); Ying Zhao, Beijing (CN); Zhenning Tao, Beijing (CN); Liang Dou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/493,831

(22) Filed: Apr. 21, 2017

(65) Prior Publication Data
US 2017/0310416 A1 Oct. 26, 2017

(30) Foreign Application Priority Data
Apr. 22, 2016 (CN) .......................... 2016 1 0256479

(51) Int. Cl.
*H04B 10/08* (2006.01)
*H04B 17/00* (2015.01)
(Continued)

(52) U.S. Cl.
CPC ...... *H04J 14/0256* (2013.01); *H04B 10/6164* (2013.01); *H04B 10/6165* (2013.01); *H04L 7/00* (2013.01)

(58) Field of Classification Search
USPC .................................................. 398/25, 208
See application file for complete search history.

(56) References Cited

U.S. PATENT DOCUMENTS 5,870,056 A * 2/1999 Fowler ...................... G01S 5/12
342/156
7,457,547 B2 * 11/2008 Frisken .............. G01M 11/0292
398/119
(Continued)

FOREIGN PATENT DOCUMENTS

CN 101677308 A 3/2010
CN 102480443 A 5/2012
(Continued)

OTHER PUBLICATIONS

Chinese Office Action dated Dec. 12, 2018 in corresponding Chinese Patent Application No. 201610256479.4.
(Continued)

*Primary Examiner* — David C Payne
*Assistant Examiner* — Pranish K Barua
(74) *Attorney, Agent, or Firm* — Staas & Halsey LLP

(57) ABSTRACT

An apparatus and method for processing a frequency offset of a pilot and a receiver where the includes: calculating a correlation function of a channel by using a receiving or received signal and a correlation length; calculating a phase to which the correlation length corresponds according to the correlation function; and calculating a corresponding slope according to phases to which at least two correlation lengths correspond when the phase to which the correlation length corresponds is greater than 2π, and estimating a frequency offset of a pilot of the channel based on the slope. Hence, estimation of a frequency offset of a pilot may be accurately achieved, thereby accurately judging channel spacing.

9 Claims, 6 Drawing Sheets

(51) Int. Cl.
  *H04B 10/06* (2006.01)
  *H04J 14/02* (2006.01)
  *H04B 10/61* (2013.01)
  *H04L 7/00* (2006.01)

(56) References Cited

U.S. PATENT DOCUMENTS

| | | | | |
|---|---|---|---|---|
| 7,869,547 B1* | 1/2011 | Xia | ........................... | H04L 7/08 |
| | | | | 375/339 |
| 2002/0168001 A1* | 11/2002 | Ramsey | ................... | H04L 1/24 |
| | | | | 375/232 |
| 2006/0269018 A1* | 11/2006 | Li | ........................ | H03D 3/007 |
| | | | | 375/343 |
| 2007/0081606 A1* | 4/2007 | Rosenfeld | ............. | G01S 5/0215 |
| | | | | 375/267 |
| 2008/0292316 A1* | 11/2008 | Litvin | ................. | H04J 14/0224 |
| | | | | 398/79 |
| 2008/0298453 A1* | 12/2008 | Lerner | ............. | H04L 25/03019 |
| | | | | 375/233 |
| 2009/0083606 A1* | 3/2009 | Choi | ...................... | H04H 20/30 |
| | | | | 714/776 |
| 2009/0323515 A1* | 12/2009 | Ishikura | ............... | H04L 5/0007 |
| | | | | 370/210 |
| 2010/0142946 A1* | 6/2010 | Liu | .................. | H04B 10/07951 |
| | | | | 398/29 |
| 2010/0316158 A1* | 12/2010 | Arne | .................... | A61B 5/0031 |
| | | | | 375/285 |
| 2011/0085487 A1* | 4/2011 | Song | ..................... | H04H 20/30 |
| | | | | 370/312 |
| 2012/0155890 A1* | 6/2012 | Zhou | .................. | H04B 10/6165 |
| | | | | 398/208 |
| 2012/0207248 A1* | 8/2012 | Ahmed | ................. | H04L 7/0087 |
| | | | | 375/340 |
| 2013/0028595 A1* | 1/2013 | Nakagawa | .......... | H04L 27/2657 |
| | | | | 398/25 |
| 2015/0139219 A1* | 5/2015 | Young | ................. | H04L 27/0014 |
| | | | | 370/350 |
| 2015/0200706 A1* | 7/2015 | Bottazzi | .................... | G01S 7/40 |
| | | | | 375/140 |
| 2015/0372766 A1* | 12/2015 | Yoshida | ............. | H04B 10/2507 |
| | | | | 398/193 |
| 2016/0036524 A1* | 2/2016 | Yan | .................... | H04L 27/0014 |
| | | | | 398/25 |

FOREIGN PATENT DOCUMENTS

| | | |
|---|---|---|
| CN | 103178947 A | 6/2013 |
| CN | 103581072 A | 2/2014 |

OTHER PUBLICATIONS

Chinese Search Report dated Dec. 12, 2018 in corresponding Chinese Patent Application No. 201610256479.4.
Hong Xie et al., "Design and realization of a discrete analysis algorithm for nonlinear dynamic network", Journal of Circuits and Systems, vol. 13, No. 4, IEEE, Aug. 2008, pp. 7-14, (abstract pp. 14).

* cited by examiner

APPARATUS AND METHOD FOR PROCESSING A FREQUENCY OFFSET OF A PILOT AND RECEIVER

CROSS-REFERENCE TO RELATED APPLICATIONS

This application claims the benefit of Chinese Application No. 201610256479.4, filed Apr. 22, 2016, in the Chinese Intellectual Property Office, the disclosure of which is incorporated herein by reference.

BACKGROUND

1. Field

The present disclosure relates to the field of wavelength division multiplexing (WDM) communication technologies, and in particular to an apparatus and method for processing a frequency offset of a pilot and a receiver.

2. Description of the Related Art

In a wavelength division multiplexing communication system, subcarrier data are modulated in several optical carriers independent of each other. Under an ideal condition, wavelengths of lasers are stable, and channel spacing of the subcarriers is constant. However, in a practical system, as wavelengths of lasers are influenced by variation of driving currents, temperature fluctuation, and resonant cavity aging, etc., output carrier wavelengths drift in a certain range.

Such indefinite variation of wavelengths brings about relatively large influence to the wavelength division multiplexing communication system, which is mainly embodied in:

(1) an occurrence of neighboring channel crosstalk between channels of the subcarriers; and (2) a signal of an edge channel being subjected to more severe distortion.

At present, an effective channel spacing monitoring method is important means for overcoming drift of laser wavelengths. On a basis of the monitoring, the wavelengths of the lasers may be adjusted with respect to feedback, so as to avoid variation of wavelengths to a great extent, thereby achieving locking of the channel spacing. Stable spacing of sub-channels can not only avoid neighboring channel crosstalk, but also make spectrum resources used more efficiently, thereby improving spectrum utilization.

In summary, channel spacing monitoring is effective means for further optimizing a wavelength division multiplexing communication system. In a process of achieving channel spacing monitoring, no extra hardware overhead is expected to be introduced, hence, attention is paid to a scheme for performing channel spacing monitoring based on digital signal processing in a receiver.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the embodiments.

It was found by the inventors that in an existing scheme for channel spacing monitoring based on pilots, channel spacing between two neighboring channels may be calculated only if a frequency offset of a pilot of an main channel and a frequency offset of a pilot of a neighboring channel are estimated. However, a problem that an estimation precision is not high exists in an existing method for estimating a frequency offset of a pilot.

Embodiments of the present disclosure provide an apparatus and method for processing a frequency offset of a pilot and a receiver, which may achieve estimation of the frequency offset of the pilot by performing digital signal processing on a pilot signal at a receiving device, thereby achieving judgment of the channel spacing.

According to a first aspect of the embodiments of the present disclosure, there is provided an apparatus for processing a frequency offset of a pilot, including:

a function calculating unit or calculator configured to calculate a correlation function of a channel by using a receiving or received signal and a correlation length;

a phase calculating unit or calculator configured to calculate a phase to which the correlation length corresponds according to the correlation function; and a frequency offset estimating unit or estimator configured to calculate a corresponding slope according to phases to which at least two correlation lengths correspond when the phase to which the correlation length corresponds is greater than $2\pi$, and estimate a frequency offset of a pilot of the channel based on the slope.

According to a second aspect of the embodiments of the present disclosure, there is provided a method for processing a frequency offset of a pilot, including:

calculating a correlation function of a channel by using a receiving signal and a correlation length;

calculating a phase to which the correlation length corresponds according to the correlation function; and calculating a corresponding slope according to phases to which at least two correlation lengths correspond when the phase to which the correlation length corresponds is greater than $2\pi$, and estimating a frequency offset of a pilot of the channel based on the slope.

According to a third aspect of the embodiments of the present disclosure, there is provided a receiver, including the apparatus for processing a frequency offset of a pilot as described above.

An advantage of the embodiments of the present disclosure exists in that the corresponding slope is calculated according to phases to which at least two correlation lengths correspond when the phase to which the correlation length corresponds is greater than $2\pi$, and a frequency offset of a pilot of the channel is estimated based on the slope. Hence, estimation of a frequency offset of a pilot may be accurately achieved, thereby accurately judging channel spacing.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Figure 1:
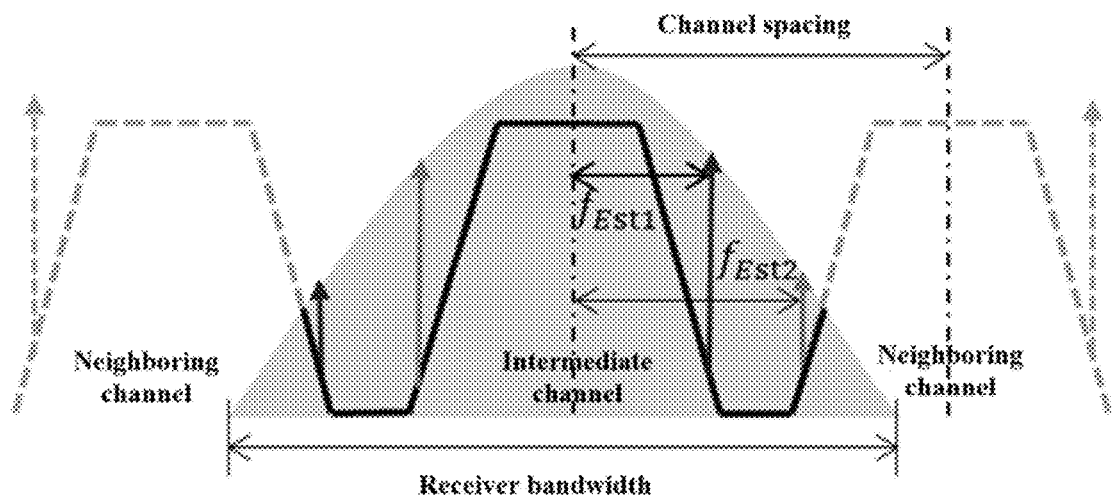
FIG. 1 is a schematic diagram of channel spacing detection based on a pilot.

FIG. 1 is a schematic diagram of channel spacing detection based on a pilot. As shown in FIG. 1, the shadow portion denotes a response of a filter of an optical receiver. It can be seen that within a bandwidth of the optical receiver, in addition to information on a main channel needing to be demodulated, information on left part of a neighboring channel and right part of a neighboring channel (or may be referred to as a neighboring channel) is also included, which is embodied as a range shown in broadened lines in FIG. 1.

Within this range, as spectra of the neighboring channels are incomplete, spacing between the two channels cannot be directly judged. In this disclosure, a change of a frequency of a pilot may reflect a change of channel spacing. Hence, spacing between channels may be obtained by respectively estimating a frequency offset of a pilot of the main channel and a frequency offset of a pilot of the neighboring channel.

Assuming that a frequency of a pilot loaded at a transmitting device is $f_p$, after processing at a receiving device, the frequency offset $f_{Est1}$ of the pilot of the main channel and the frequency offset $f_{Est2}$ of the pilot of the neighboring channel may be estimated, and a relationship between the two frequency offsets and the spacing between the two neighboring channels may be expressed by formula 1:

$$\text{Spacing} = |f_{Est2} - f_{Est1}| + 2 * f_p \qquad \text{formula 1.}$$

It can be seen from formula 1 that the spacing between the two neighboring channels may be calculated only if the frequency offset of the pilot of the main channel and the frequency offset of the pilot of the neighboring channel are estimated. In order to accurately estimate the frequency offset of the pilot of the main channel and the frequency offset of the pilot of the neighboring channel, digital signal processing may be performed on a signal of the receiving device.

This disclosure shall be described below in detail.

Embodiment 1

An embodiment of this disclosure provides an apparatus for processing a frequency offset of a pilot, which may be configured in a receiver of a WDM communication system.

Figure 2:
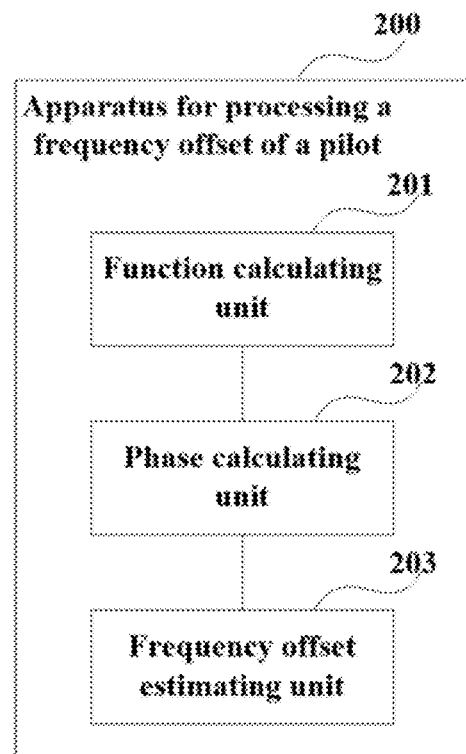
FIG. 2 is a schematic diagram of the apparatus for processing a frequency offset of a pilot of Embodiment 1 of this disclosure.

FIG. 2 is a schematic diagram of the apparatus for processing a frequency offset of a pilot of the embodiment of this disclosure. As shown in FIG. 2, the apparatus 200 for processing a frequency offset of a pilot includes:

a function calculating unit 201 configured to calculate a correlation function of a channel by using a receiving or received signal and a correlation length;

a phase calculating unit 202 configured to calculate a phase to which the correlation length corresponds according to the correlation function; and a frequency offset estimating unit 203 configured to calculate a corresponding slope according to phases to which at least two correlation lengths correspond when the phase to which the correlation length corresponds is greater than $2\pi$, and estimate a frequency offset of a pilot of the channel based on the slope.

In this embodiment, the correlation length may be predetermined. In order that the estimation of the frequency offset of the pilot is more accurate, a value of the correlation length in this embodiment may be relatively large (such as being larger than a threshold), and multiple correlation lengths may be predetermined, such as L1, L2, . . . .

For example, first, the correlation function R(L1) of the channel may be calculated by using the receiving signal and the correlation length L1, and the phase Phase1 to which L1 corresponds may be calculated according to R(L1); and when Phase1 is greater than $2\pi$, the correlation function R(L2) of the channel may be calculated by using the receiving signal and the correlation length L2, and the phase Phase2 to which L2 corresponds may be calculated according to R(L2); then the slope is calculated according to Phase1 and Phase2, and the frequency offset of the pilot of the channel is estimated based on the slope.

In this embodiment, the frequency offset estimating unit 203 may further be configured to obtain the frequency offset of the pilot of the channel according to the phase to which the correlation length corresponds when the phase to which the correlation length corresponds is less than or equal to $2\pi$.

For example, first, the correlation function R(L1) of the channel may be calculated by using the receiving signal and the correlation length L1, and the phase Phase1 to which L1 corresponds may be calculated according to R(L1); and when Phase1 is less than or equal to $2\pi$, the frequency offset of the pilot of the channel is directly obtained according to Phase1.

Hence, in comparison with the scheme in the prior art that in performing estimation of a frequency offset of a pilot, only one correlation length is used and a value of the correlation length is relatively small, the embodiment of this disclosure may use at least two correlation lengths, and values of the correlation lengths may be relatively large, thereby more accurately estimating the frequency offset of the pilot.

The embodiment of this disclosure shall be further described below.

In the processing of estimating the frequency offset of the pilot, digital signal processing may be performed on the receiving signal. The digital signal processing in a receiving device may include preprocessing and frequency offset estimation. The preprocessing may include filtering and shifting frequency, and the frequency offset estimation may include one-stage frequency offset estimation (corresponding to a case where a phase to which a correlation length corresponds is less than or equal to $2\pi$) and two-stage frequency offset estimation (corresponding to a case where a phase to which a correlation length corresponds is greater than $2\pi$). Such processing may effectively improve the precision of the frequency offset estimation.

Figure 3:
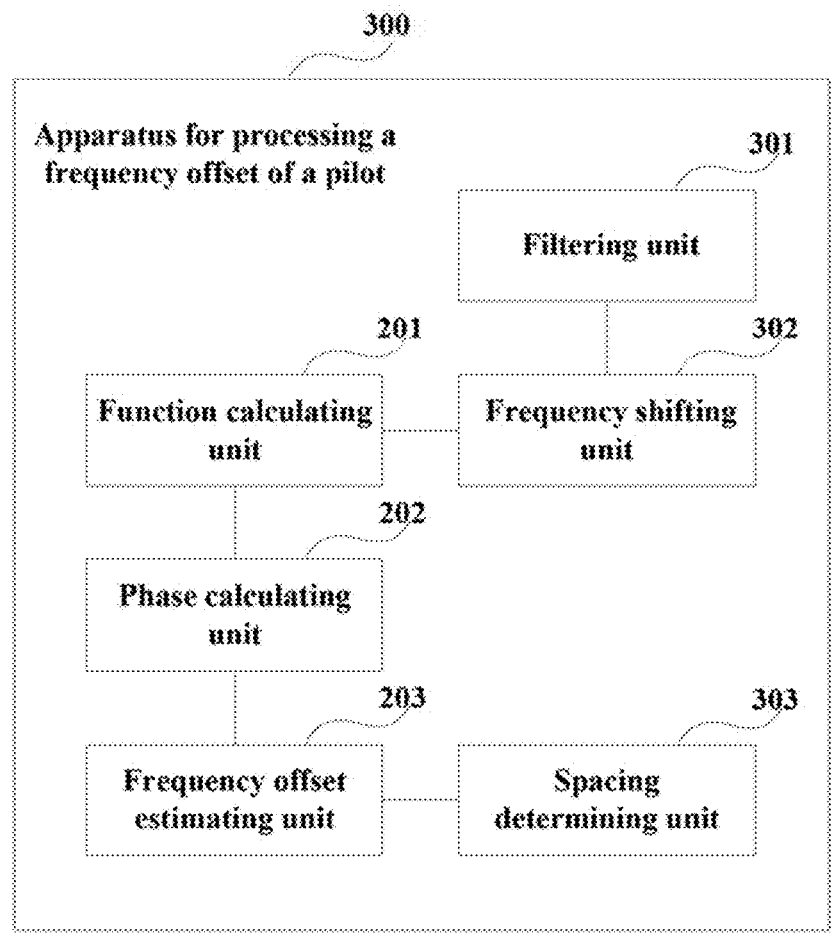
FIG. 3 is another schematic diagram of the apparatus for processing a frequency offset of a pilot of Embodiment 1 of this disclosure.

FIG. 3 is another schematic diagram of the apparatus for processing a frequency offset of a pilot of the embodiment of this disclosure. As shown in FIG. 3, the apparatus 300 for processing a frequency offset of a pilot includes a function calculating unit 201, a phase calculating unit 202 and a frequency offset estimating unit 203, as described above.

As shown in FIG. 3, the apparatus 300 for processing a frequency offset of a pilot may further include:

a filtering unit 301 configured to filter the receiving signal.

In this embodiment, in performing frequency offset estimation by using a pilot, all signals other than the pilot may belong to noises, which may result in that noise power is very large, severely affecting performance of subsequent frequency offset estimation. Hence, before performing the frequency offset estimation, the noise power in the receiving signal may be reduced first. In particular, the receiving signals may be filtered.

For example, the receiving signal is made to pass through a narrow-pass filter, which may effectively filter signals out of a bandwidth range of the filter, thereby effectively reducing noise power. For the main channel and the neighboring channel, different filters may be added to carry out such a function.

For the main channel, a range of frequency of a pilot of the main channel of the receiving device may be substantially determined according to some priori parameters, such as a wavelength drift range designated by a laser and a frequency of a pilot loaded at the transmitting device. In this embodiment, particular values of the two parameters, the wavelength drift range designated by a laser and the frequency of a pilot loaded at the transmitting device, are not limited, and may be determined according to an actual situation.

In this embodiment, the frequency $f_p$ of a pilot signal loaded at the transmitting device may be set to be 16 GHz, and a wavelength drift range of an integrated tunable laser module may be set to be $\pm 1.25$ GHz. According to these data, a frequency range of a pilot of the main channel may be directly estimated as being about [14.75 GHz 17.75 GHz], which is taken as a 3 dB cut-off bandwidth of the added bandpass filter (i.e. a corresponding bandwidth when the power is lowered by a half of the maximum value).

Figure 4:
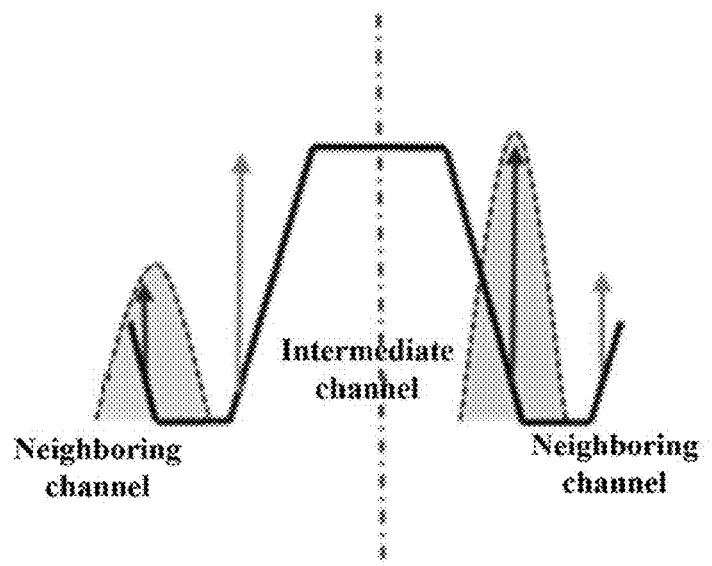
FIG. 4 is a schematic diagram of a receiving signal spectrum and a filter response of Embodiment 1 of this disclosure.

FIG. 4 is a schematic diagram of a receiving signal spectrum and a filter response of the embodiment of this disclosure. As shown in FIG. 4, the right shadow portion denotes a response of a filter added to the main channel. A type of the filter is not limited in this disclosure, which may be a rectangular filter, or a Gaussian filter, etc.

For the neighboring channel, a range of frequency of a pilot of the neighboring channel of the receiving device may be substantially determined according to some priori parameters, such as a range of fluctuation of channel spacing, a frequency of a pilot loaded at the transmitting device, and a wavelength drift range designated by a laser. Likewise, particular values of these parameters are not limited in this embodiment.

In this embodiment, the range of fluctuation of channel spacing may be set to be about [35 GHz 40 GHz], the frequency $f_p$ of a pilot loaded at the transmitting device may be set to be 16 GHz, and the wavelength drift range of an integrated tunable laser module may be set to be $\pm 1.25$ GHz, hence, the frequency range of a pilot of the neighboring channel may be about [17.75 GHz 25.75 GHz], which is taken as a 3 dB cut-off bandwidth of the added bandpass filter.

As shown in FIG. 4, the left shadow portion denotes a response of a filter added to the neighboring channel. Likewise, a type of the filter is not limited in this disclosure, which may be a rectangular filter, or a Gaussian filter, etc.

As shown in FIG. 3, the apparatus 300 for processing a frequency offset of a pilot may further include:

a frequency shifting unit 302 configured to perform frequency shifting on the filtered signal.

And the function calculating unit 201 may further be configured to calculate the correlation function of the channel by using the filtered and frequency-shifted signal and the correlation length.

In this embodiment, the signal enters into the frequency shifting unit 302 after being noise filtered by the filtering unit 301. The frequency shifting unit 302 may shift the pilot of the main channel and the pilot of the neighboring channel to positions close to a zero frequency.

Particularly, it may be achieved by formula 2 below:

$$z(n)=r(n)\times p(n)^* \qquad \text{formula 2;}$$

where, z(n) denotes a frequency-shifted signal, r(n) denotes a filtered signal of the receiving device, p(n) denotes a single-frequency signal, which may be denoted as formula 3, and * denotes a conjugate operation.

$$p(n)=e^{j*2\pi*f_p*n*T} \qquad \text{formula 3;}$$

where, $f_p$ denotes a frequency of a pilot, and T denotes a sampling period.

In this embodiment, the frequency range of a pilot of the main channel is about [14.75 GHz 17.75 GHz], and the frequency range of a pilot of the neighboring channel is about [17.75 GHz 25.75 GHz]. It can be seen that a frequency of a pilot to be estimated is relatively high, which may possibly affect the performance of the frequency offset estimation.

After processed by using formula 2, the frequency range of a pilot of the main channel is about [−1.75 GHz 1.75 GHz], and the frequency range of a pilot of the neighboring channel is about [1.75 GHz 9.75 GHz]. Thus, the frequency shifting operation may decrease the range of frequency of a pilot to be estimated to some extent, thereby improving the performance of subsequent frequency offset estimation.

In this embodiment, after the receiving signal is preprocessed, the frequency offset estimation may be performed, so as to obtain the frequency offset $f_{Est1}$ of a pilot of the main channel and the frequency offset $f_{Est2}$ of a pilot of the neighboring channel.

The frequency offset estimation may be divided into one-stage frequency offset estimation and two-stage frequency offset estimation in this embodiment; a frequency offset obtained by the one-stage frequency offset estimation is only a fractional portion of a frequency offset of a pilot, and the two-stage frequency offset estimation may estimate the whole frequency offset by using the fractional portion obtained in the one-stage frequency offset estimation.

The one-stage frequency offset estimation and the two-stage frequency offset estimation shall be described below respectively.

In the one-stage frequency offset estimation, the frequency offset may be estimated by using latency correlation algorithm, which may be expressed by formula 4 below:

$$R(L) = \sum_{n=L+1}^{N} z(n) \times z(n-L)^* \quad \text{formula 4;}$$

where, z(n) denotes a preprocessed signal, L denotes a correlation length, N denotes a length of z(n), and z(n−L)* denotes a conjugate of z(n−L).

z(n) in formula 4 may be deemed as being constituted by two parts, a signal and a noise, and after being preprocessed, z(n) may be expressed by formula 5 below:

$$z(n) = e^{j*2\pi*\Delta f*n*T} + N(n) \quad \text{formula 5;}$$

where, $\Delta f$ denotes the frequency offset of the pilot, T denotes a sampling period, and N(n) denotes a noise signal.

If the item of noise signal is neglected, formula 6 may be obtained:

$$\sum_{n=L+1}^{N} z(n) \times z(n-L)^* = \sum_{n=L+1}^{N} e^{j*2\pi*\Delta f*n*T} * e^{-j*2\pi*\Delta f*(n-L)*T} = e^{j*2\pi*\Delta f*L*T} \quad \text{formula 6;}$$

A relationship between a phase Phase of R(L) and the frequency offset $\Delta f$ of the pilot may be obtained from formula 6, as shown by formula 7 below:

$$\text{Phase} = 2\pi*\Delta f*L*T \quad \text{formula 7.}$$

Hence, the frequency offset of the pilot may be calculated only if the phase of R(L) is obtained by using a method.

In this embodiment, the phase of R(L) may be obtained by using an angle function, as shown by formula 8 below:

$$\text{Phase}_{dec} = \text{angle}(R(L)) \quad \text{formula 8.}$$

As a range of phase that may be estimated by the angle function is [0 2π], i.e. $\text{Phase}_{dec} \in [0\ 2\pi]$, this method is only applicable to a case where the phase of R(L) is less than 2π. The relevant art, such as contents related to MATLAB, may be referred to for particular contents of the angle function.

In a case where a phase to which the correlation length corresponds is less than or equal to 2π, the frequency offset estimating unit 203 may obtain the frequency offset of the pilot by directly using the phase to which the correlation length corresponds. For example, when Phase<2π, Phase=$\text{Phase}_{dec}$, and at this moment, the frequency offset $\Delta f$ of the pilot may be calculated by directly using formulae 4, 7 and 8.

It can be seen from formula 7 that when the sampling period is fixed, a size of the phase is determined by the frequency offset of the pilot and the correlation length L. In this embodiment, for example, T=1/64 ns, after the signal passes through the frequency shifting unit 302, the frequency range of a pilot of the neighboring channel is about [1.75 GHz 9.75 GHz], and for the neighboring channel, the frequency offset of the pilot to be estimated is still relatively large. This will result in that the phase exceeds 2π, that is Phase>2π, and as the range of frequency that may be estimated by formula 7 is less than or equal to 2π, the phase Phase may also be expressed as:

$$\text{Phase} = 2\pi \times i + \text{Phase}_{dec} \quad \text{formula 9;}$$

where, i denotes an integer, 2π×i denotes an integral portion of the phase, and $\text{Phase}_{dec}$ denotes a fractional portion of the phase, in which case the phase calculated by using formula 8 is only a fractional portion of a real phase. In order to obtain the real phase Phase, the two-stage frequency offset estimation needs to be performed.

In the two-stage frequency offset estimation, the real phase Phase may be obtained by using multiple $\text{Phase}_{dec}$s. It can be seen according to formula 7 that the phase Phase is a linear function of the correlation length L, and the slope satisfies the following formula:

$$k = 2\pi*\Delta f*T \quad \text{formula 10.}$$

Hence, the frequency offset $\Delta f$ may be calculated according to the slope to which the phase corresponds.

Figure 5:
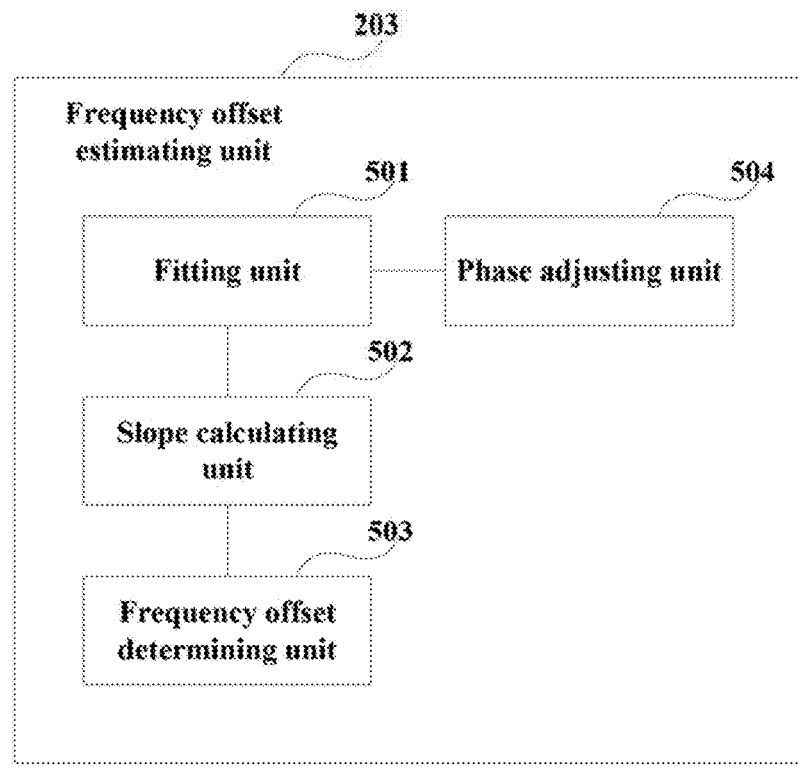
FIG. 5 is a schematic diagram of a frequency offset estimating unit of Embodiment 1 of this disclosure.

FIG. 5 is a schematic diagram of the frequency offset estimating unit of the embodiment of this disclosure. As shown in FIG. 5, the frequency offset estimating unit 302 includes:

a fitting unit 501 configured to perform one-stage fitting on the phases to which the at least two correlation lengths correspond;

a slope calculating unit 502 configured to calculate the slope to which the at least two correlation lengths correspond according to a fitting result; and a frequency offset determining unit 503 configured to determine the frequency offset of the pilot of the channel based on the slope.

As shown in FIG. 5, the frequency offset estimating unit 302 may further include:

a phase adjusting unit 504 configured to, in a case where a difference between a neighboring first phase and a second phase in the phases to which the at least two correlation lengths correspond is greater than π, add 2π to the second phase to obtain an adjusted second phase;

and the fitting unit 501 may further be configured to perform one-stage fitting according to the adjusted phases.

For example, different correlation lengths, L=$L_1$, $L_2$, $L_3$, ... $L_n$, may be taken, and correlation values $R(L_j)$ under different $L_j$s may respectively be calculated by using formula 4, j=1, 2, 3 ... n. Then $\text{Phase}_{dec}$s under different $L_j$s may respectively be calculated by using formula 8. When the difference between two neighboring phases $\text{Phase}_{dec_j}$ and $\text{Phase}_{dec_{j+1}}$ is greater than π, a new phase value $\text{Phase}_{j+1}$ is obtained by adding 2π to $\text{Phase}_{dec_{j+1}}$. In this way, phases to which the multiple correlation lengths respectively correspond may be obtained.

Figure 6:
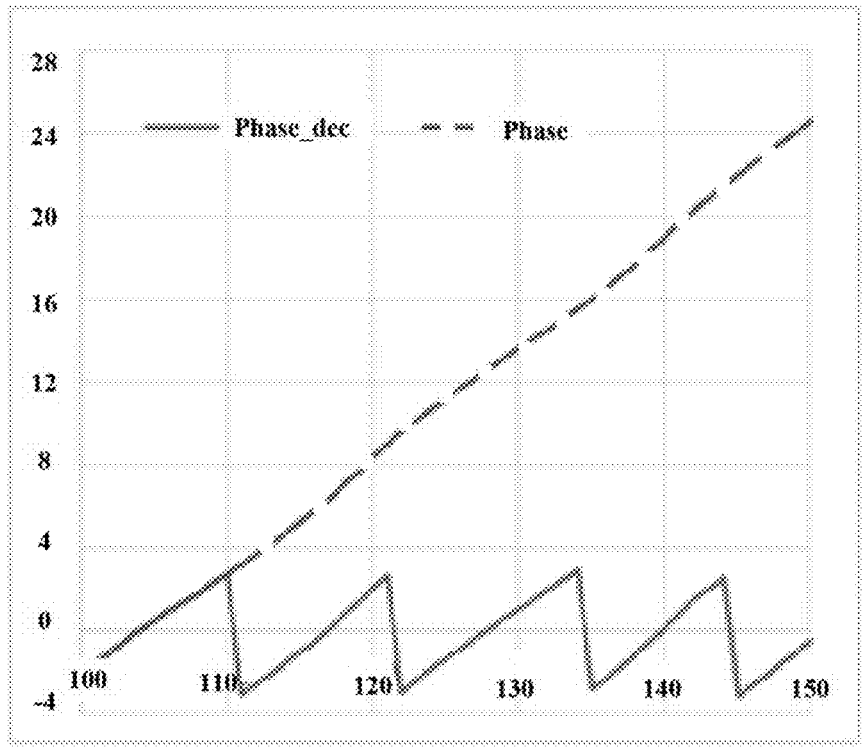
FIG. 6 is a schematic diagram of multiple phases of Embodiment 1 of this disclosure.

FIG. 6 is a schematic diagram of multiple phases of the embodiment of this disclosure, in which a relationship between a phase and the correlation length L is shown. As shown in FIG. 6, the horizontal axis denotes L, and the vertical axis denotes the phase. The solid line denotes a fractional portion Phased$_{dec_j}$ of the whole phase, and the dotted line denotes a new phase value Phase$_j$ obtained after phase adjustment.

In this embodiment, after the Phase$_j$ is obtained, the slope k may be obtained after performing one-stage fitting on Phase$_j$, and then the frequency offset Δf of the pilot may be determined by using formula 10 based on the slope k.

Figure 7:
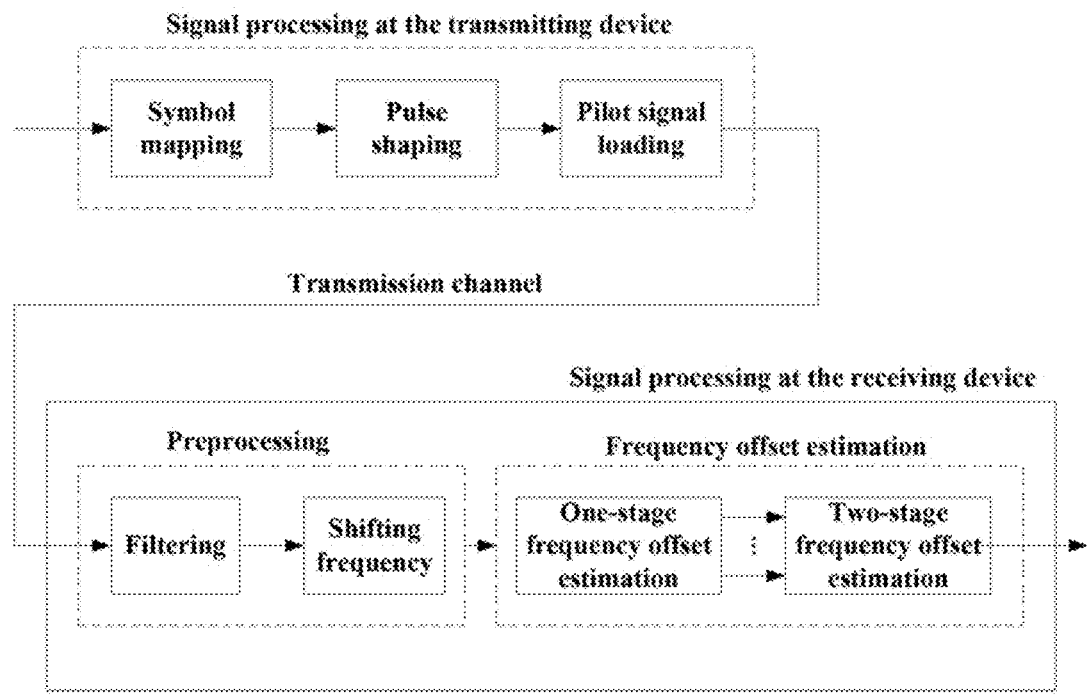
FIG. 7 is a schematic diagram of estimation of a frequency offset of a pilot of Embodiment 1 of this disclosure.

FIG. 7 is a schematic diagram of the estimation of a frequency offset of a pilot of the embodiment of this disclosure, in which cases of processing of part of signals of the transmitting device and the receiving device related to this disclosure are shown. As shown in FIG. 7, symbol mapping, pulse shaping, and pilot signal loading, etc., may be performed at the transmitting device; then the signal reaches the receiving device via a transmission channel; and preprocessing (such as filtering and shifting frequency) may be performed at the receiving device, then the frequency offset estimation (including one-state frequency offset estimation and two-stage frequency offset estimation) is performed. Thus, the frequency offset of the pilot may be estimated accurately.

In this embodiment, the frequency offset of the pilot of the main channel and the frequency offset of the pilot of the neighboring channel may be estimated respectively.

As shown in FIG. 3, the apparatus 300 for processing a frequency offset of a pilot may further include:

a spacing determining unit 303 configured to determine channel spacing between two neighboring channels according to the frequency offset of the pilot of the main channel, the frequency offset of the pilot of the neighboring channel and a frequency of a pilot signal loaded at the transmitting device.

That is, after the frequency offset $f_{Est1}$ of the pilot of the main channel and the frequency offset $f_{Est2}$ of the pilot of the neighboring channel are accurately estimated, the channel spacing between the two neighboring channels may be estimated according to formula 1.

It can be seen from the above embodiment that the slope may be calculated according to the phases to which the at least two correlation lengths correspond when the phase to which the correlation length corresponds is greater than 2π, and the frequency offset of the pilot of the channel may be estimated based on the slope. Hence, estimation of the frequency offset of the pilot may be accurately achieved, thereby accurately judging channel spacing.

Embodiment 2

An embodiment of this disclosure provides a method for processing a frequency offset of a pilot, with contents identical those in Embodiment 1 being not going to be described herein any further.

Figure 8:
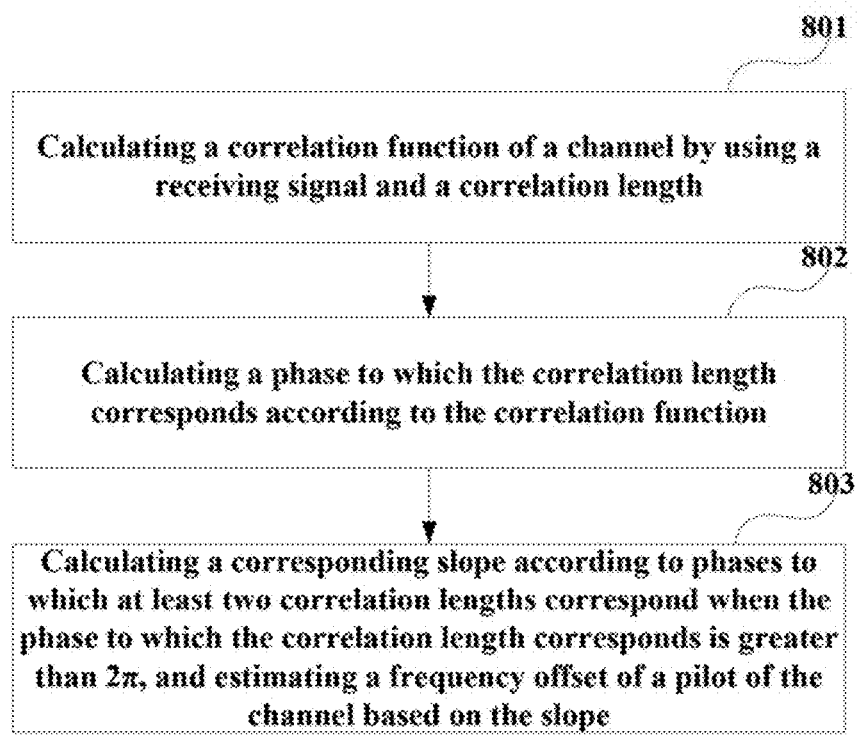
FIG. 8 is a flowchart of the method for processing a frequency offset of a pilot of Embodiment 2 of this disclosure.

FIG. 8 is a flowchart of the method for processing a frequency offset of a pilot of the embodiment of this disclosure. As shown in FIG. 8, the method for processing includes:

step 801: calculating a correlation function of a channel by using a receiving signal and a correlation length;

step 802: calculating a phase to which the correlation length corresponds according to the correlation function; and step 803: calculating a corresponding slope according to phases to which at least two correlation lengths correspond when the phase to which the correlation length corresponds is greater than 2π, and estimating a frequency offset of a pilot of the channel based on the slope.

Figure 9:
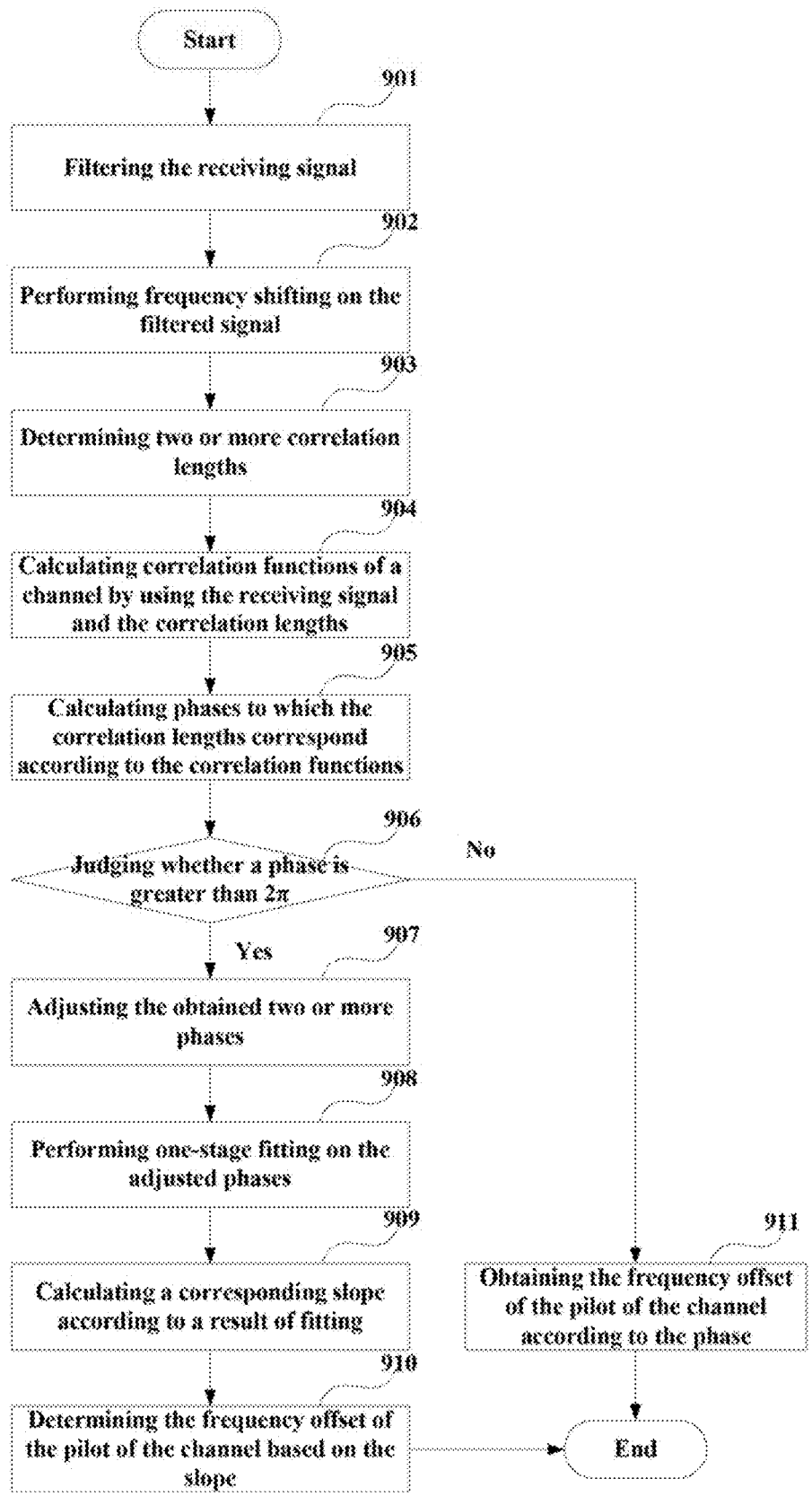
FIG. 9 is another flowchart of the method for processing a frequency offset of a pilot of Embodiment 2 of this disclosure.

FIG. 9 is another flowchart of the method for processing a frequency offset of a pilot of the embodiment of this disclosure. As shown in FIG. 9, the method for processing includes:

step 901: filtering a receiving signal; and step 902: performing frequency shifting on the filtered signal.

Embodiment 1 may be referred to for how to filter and how to perform frequency shifting;

step 903: determining two or more correlation lengths Lj;

step 904: calculating correlation functions of a channel by using the receiving signal and the correlation lengths Lj;

step 905: calculating phases to which the correlation lengths Lj correspond according to the correlation functions;

step 906: judging whether a phase (such as a phase to which L1 corresponds) is greater than 2π, and executing step 907 if yes, otherwise, executing step 911;

step 907: adjusting the obtained two or more phases;

for example, in a case where a difference between a neighboring first phase and a second phase is greater than π, 2π is added to the second phase to obtain an adjusted second phase;

step 908: performing one-stage fitting on the adjusted phases;

step 909: calculating a corresponding slope according to a result of fitting;

step 910: determining the frequency offset of the pilot of the channel based on the slope;

the following formula may be employed:

$$k=2\pi*\Delta f*T;$$

where, k is the corresponding slope, Δf is the frequency offset of the pilot of the channel, and T is a sampling period;

step 911: obtaining the frequency offset of the pilot of the channel according to the phase (such as a phase to which L1 corresponds);

the following formula may be employed:

$$\text{Phase}=2\pi*\Delta f*L*T;$$

where, phase denotes the phase to which the correlation length corresponds, Δf is the frequency offset of the pilot, and T is a sampling period.

It should be noted that the embodiment of this disclosure is only illustrated in FIG. 9. However, this disclosure is not limited thereto; for example, an order of executing the steps may be suitably adjusted, and furthermore, some other steps may be added or some of these steps may be reduced. And suitable modification may be made by those skilled in the art according to the above contents, without being limited to what is contained in the above drawings.

In FIG. 9, the phases to which the two or more correlation lengths correspond are directly calculated in steps 903-905, and the slope to which the two or more correlation lengths correspond are calculated when one of the phases (such as a phase to which L1 corresponds) is greater than 2π. However, this disclosure is not limited thereto; for example, one phase to which one correlation length (L1) corresponds may be calculated first, then the other one or more correlation lengths (L2, etc.) may be determined when the phase is greater than 2π, and one or more corresponding phases may be calculated, thereafter, the slope to which these correlation lengths correspond are calculated.

In this embodiment, the frequency offset of the pilot of the main channel and the frequency offset of the pilot of the neighboring channel may be estimated respectively. And the method for processing may further include: determining channel spacing between two neighboring channels according to the frequency offset of the pilot of the main channel, the frequency offset of the pilot of the neighboring channel and a frequency of a pilot signal loaded at a transmitting device.

It can be seen from the above embodiment that the slope may be calculated according to the phases to which the at least two correlation lengths correspond when the phase to which the correlation length corresponds is greater than $2\pi$, and the frequency offset of the pilot of the channel may be estimated based on the slope. Hence, estimation of the frequency offset of the pilot may be accurately achieved, thereby accurately judging channel spacing.

Embodiment 3

An embodiment of this disclosure provides a wavelength division multiplexing communication system, including a transmitter and a receiver.

Figure 10:
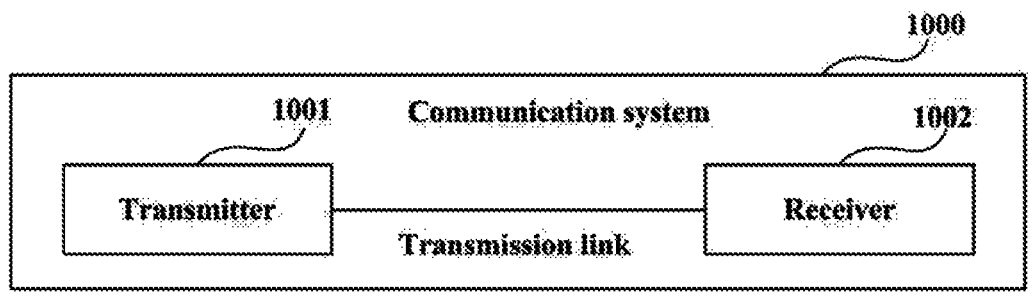
FIG. 10 is a schematic diagram of a wavelength division multiplexing communication system of Embodiment 3 of this disclosure.

FIG. 10 is a schematic diagram of a wavelength division multiplexing communication system of the embodiment of this disclosure. As shown in FIG. 10, the wavelength division multiplexing communication system 1000 includes a transmitter 1001 and a receiver 1002.

The transmitter 1001 may perform symbol mapping, pulse shaping, and pilot signal loading, etc.

And the receiver 1002 may include the apparatus 200 or 300 for processing a frequency offset of a pilot as described in Embodiment 1.

An embodiment of this disclosure further provides a receiver, which may convert an inputted optical signal into a baseband signal at two polarization states, the two polarization states including an H polarization state and a V polarization state.

Figure 11:
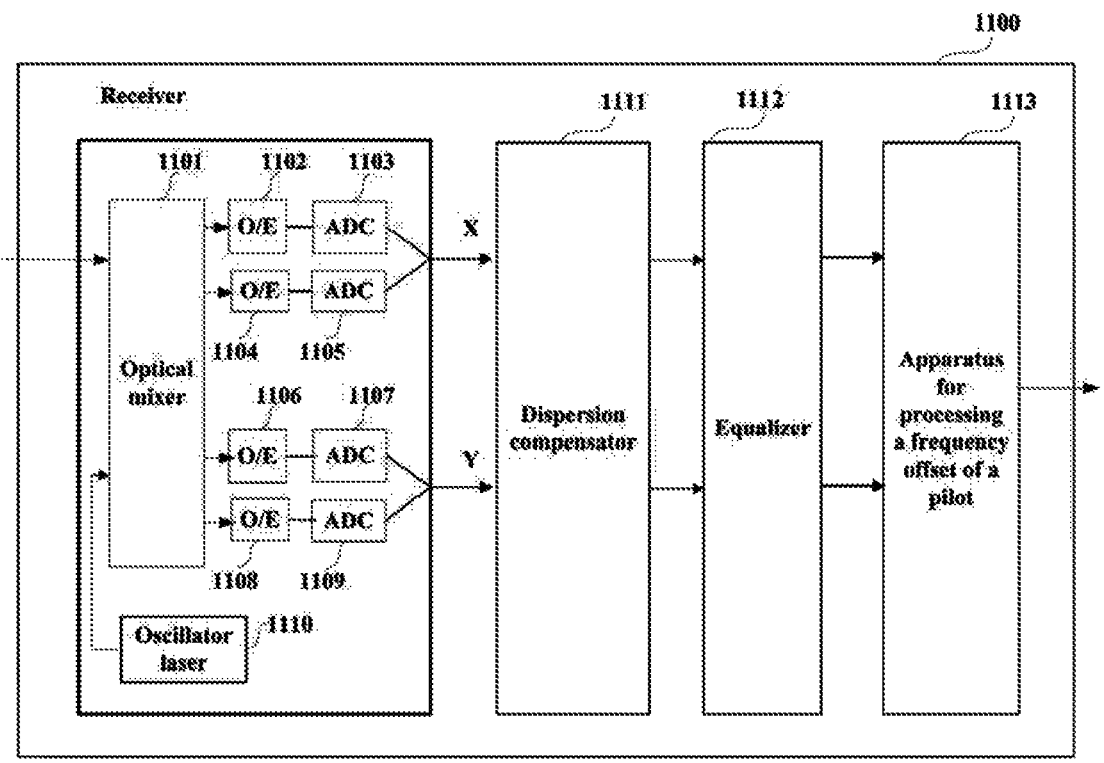
FIG. 11 is a schematic diagram of the receiver of Embodiment 3 of this disclosure.

FIG. 11 is a schematic diagram of the receiver of the embodiment of this disclosure. As shown in FIG. 11, the receiver 1100 includes an oscillator laser 1110, an optical mixer 1101, optoelectronic (O/E) detectors 1102, 1104, 1106 and 1108, analog-to-digital converters (ADCs) 1103, 1105, 1107 and 1109, a dispersion compensator 1111, an equalizer 1112 and an apparatus 1113 for processing a frequency offset of a pilot.

A structure of the apparatus 1113 for processing a frequency offset of a pilot may be as shown in FIG. 3 of Embodiment 1, which shall not be described herein any further. The oscillator laser 1110 is configured to supply a local light source. An optical signal is converted into a baseband signal at a polarization state after passing through the optical mixer 1101, the optoelectronic (O/E) detectors 1102 and 1104, the analog-to-digital converters (ADCs) 1103 and 1105, and is converted into a baseband signal at another polarization state after passing through the optical mixer 1101, the optoelectronic (O/E) detectors 1106 and 1108, the analog-to-digital converters (ADCs) 1107 and 1109, with a particular process being similar to the prior art, and being not going to be described herein any further.

Furthermore, if a frequency offset and a phase noise have effects on estimation of an optical signal noise ratio (OSNR), the receiver 1100 may also include a frequency offset compensator and a phase noise compensator (not shown in FIG. 11).

It should be noted that the embodiment of this disclosure is only illustrated in FIG. 11. However, this disclosure is not limited thereto. The receiver 1100 does not necessarily include all the parts shown in FIG. 11, and furthermore, the receiver 1100 may include parts not shown in FIG. 11, and the relevant art may be referred to.

An embodiment of the present disclosure provides a computer readable program code, which, when executed in a receiver, will cause the receiver to carry out the method for processing a frequency offset of a pilot as described in Embodiment 2.

An embodiment of the present disclosure provides a non-transitory computer readable medium, including a computer readable program code, which will cause a receiver to carry out the method for processing a frequency offset of a pilot as described in Embodiment 2.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

For implementations of the present disclosure containing the above embodiments, following supplements are further disclosed.

Supplement 1. An apparatus for processing a frequency offset of a pilot, including:

a function calculating unit configured to calculate a correlation function of a channel by using a receiving signal and a correlation length;

a phase calculating unit configured to calculate a phase to which the correlation length corresponds according to the correlation function; and a frequency offset estimating unit configured to calculate a corresponding slope according to phases to which at least two correlation lengths correspond when the phase to which the correlation length corresponds is greater than $2\pi$, and estimate a frequency offset of a pilot of the channel based on the slope.

Supplement 2. The apparatus for processing according to supplement 1, wherein the frequency offset estimating unit includes:

a fitting unit configured to perform one-stage fitting on the phases to which the at least two correlation lengths correspond;

a slope calculating unit configured to calculate the slope to which the at least two correlation lengths correspond according to a fitting result; and a frequency offset determining unit configured to determine the frequency offset of the pilot of the channel based on the slope.

Supplement 3. The apparatus for processing according to supplement 2, wherein the frequency offset determining unit is configured to determine the frequency offset of the pilot of the channel by using the formula below:

$$k=2\pi*\Delta f*T;$$

where, k is the slope to which the at least two correlation lengths correspond, Δf is the frequency offset of the pilot of the channel, and T is a sampling period.

Supplement 4. The apparatus for processing according to supplement 2, wherein the frequency offset estimating unit further includes:

a phase adjusting unit configured to, in a case where a difference between a neighboring first phase and a second phase in the phases to which the at least two correlation lengths correspond is greater than π, add 2π to the second phase to obtain an adjusted second phase;

Supplement 5. The apparatus for processing according to supplement 1, wherein the frequency offset estimating unit is further configured to obtain the frequency offset of the pilot of the channel according to the phase to which the correlation length corresponds in a case where the phase to which the correlation length corresponds is less than or equal to 2π.

Supplement 6. The apparatus for processing according to supplement 1, wherein the channel is a main channel or a neighboring channel, the frequency offset estimating unit is configured to estimate respectively a frequency offset of a pilot of the main channel and a frequency offset of a pilot of the neighboring channel.

Supplement 7. The apparatus for processing according to supplement 6, wherein the apparatus for processing further includes:

a spacing determining unit configured to determine channel spacing between two neighboring channels according to the frequency offset of the pilot of the main channel, the frequency offset of the pilot of the neighboring channel and a frequency of a pilot signal loaded at a transmitting device.

Supplement 8. The apparatus for processing according to supplement 1, wherein the apparatus for processing further includes:

a filtering unit configured to filter the receiving signal; and a frequency shifting unit configured to perform frequency shifting on the filtered signal.

Supplement 9. The apparatus for processing according to supplement 1, wherein the function calculating unit is configured to use the following formula:

$$R(L)=\Sigma_{n=L+1}^{N} z(n) \times z(n-L)^*;$$

and the phase calculating unit is configured to obtain the phase to which the correlation length corresponds by using an angle function;

where, z(n) denotes the receiving signal, N denotes a length of z(n), L denotes the correlation length, R(L) denotes the correlation function, and * denotes a conjugate operation.

Supplement 10. The apparatus for processing according to supplement 5, wherein the frequency offset estimating unit is configured to use the following formula in a case where the phase to which the correlation length corresponds is less than or equal to 2π:

$$\text{Phase}=2\pi^*\Delta f^*L^*T;$$

where, phase denotes the phase to which the correlation length corresponds, Δf denotes the frequency offset of the pilot, and T is a sampling period.

Supplement 11. A method for processing a frequency offset of a pilot, including:

calculating a correlation function of a channel by using a receiving signal and a correlation length;

calculating a phase to which the correlation length corresponds according to the correlation function; and calculating a corresponding slope according to phases to which at least two correlation lengths correspond when the phase to which the correlation length corresponds is greater than 2π, and estimating a frequency offset of a pilot of the channel based on the slope.

Supplement 12. The method for processing according to supplement 11, wherein the calculating a corresponding slope according to phases to which at least two correlation lengths correspond, and estimating a frequency offset of a pilot of the channel based on the slope, includes:

performing one-stage fitting on the phases to which the at least two correlation lengths correspond;

calculating the slope to which the at least two correlation lengths correspond according to a fitting result; and determining the frequency offset of the pilot of the channel based on the slope.

Supplement 13. The method for processing according to supplement 11, wherein the following formula is used:

$$k=2\pi^*\Delta f^*T;$$

where, k is the slope to which the at least two correlation lengths correspond, Δf is the frequency offset of the pilot of the channel, and T is a sampling period.

Supplement 14. The method for processing according to supplement 12, wherein the method for processing further includes:

in a case where a difference between a neighboring first phase and a second phase in the phase to which the at least two correlation lengths correspond is greater than π, adding 2π to the second phase to obtain an adjusted second phase.

Supplement 15. The method for processing according to supplement 11, wherein the method for processing further includes:

in a case where the phase to which the correlation length corresponds is less than or equal to 2π, obtaining the frequency offset of the pilot of the channel according to the phase to which the correlation length corresponds.

Supplement 16. The method for processing according to supplement 11, wherein the channel is a main channel or a neighboring channel, and the method for processing further includes:

estimating respectively a frequency offset of a pilot of the main channel and a frequency offset of a pilot of the neighboring channel.

Supplement 17. The method for processing according to supplement 16, wherein the method for processing further includes:

determining channel spacing between two neighboring channels according to the frequency offset of the pilot of the main channel, the frequency offset of the pilot of the neighboring channel and a frequency of a pilot signal loaded at a transmitting device.

Supplement 18. The method for processing according to supplement 11, wherein the method for processing further includes:

filtering the receiving signal; and performing frequency shifting on the filtered signal.

Supplement 19. A wavelength division multiplexing communication system, including a transmitter and a receiver; wherein, the receiver is configured with the apparatus for processing a frequency offset of a pilot as described in any one of supplements 1-10.

Supplement 20. A receiver, including the apparatus for processing a frequency offset of a pilot as described in any one of supplements 1-10.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An apparatus for processing a frequency offset of a pilot signal, to stabilize spacing of sub-channels and optimize a Wavelength Division Multiplexing (WDM) communication system, the apparatus is configured in a receiver of the WDM communication system, and the apparatus comprising a digital signal processor, which is configured to:

calculate at least two correlation functions of a channel by using a received signal and at least two correlation lengths, each correlation function corresponds to a correlation length;

calculate at least two phases to which the at least two correlation lengths corresponds according to the at least two correlation functions, respectively, and when a difference between a neighboring first phase and a second phase in the phases to which the at least two correlation lengths correspond is greater than $\pi$, add $2\pi$ to the second phase to obtain an adjusted second phase; and perform fitting on adjusted phases to which the at least two correlation lengths correspond and calculate a corresponding slope according to a fitting result when the phase to which at least one of the at least two correlation lengths corresponds is greater than $2\pi$, and estimate the frequency offset of the pilot signal of the channel based on the slope.

2. The apparatus for processing according to claim 1, wherein the digital signal processor is further is configured to determine the frequency offset of the pilot signal of the channel by using:

$$k=2\pi*\Delta f*T;$$

where, k is the slope to which the at least two correlation lengths correspond, $\Delta f$ is the frequency offset of the pilot signal of the channel, and T is a sampling period.

3. The apparatus for processing according to claim 1, wherein the digital signal processor is further configured to obtain the frequency offset of the pilot signal of the channel according to the phase to which the correlation length corresponds when the phase to which one of the at least two correlation lengths corresponds is less than or equal to $2\pi$.

4. The apparatus for processing according to claim 3, wherein the digital signal processor is configured to estimate the frequency offset of the pilot of the channel by using:

$$\text{Phase}=2\pi*\Delta f*L*T;$$

where, Phase denotes the phase to which one of the at least two correlation lengths corresponds, $\Delta f$ is the frequency offset of the pilot signal, L is the correlation length, and T is a sampling period.

5. The apparatus for processing according to claim 1, wherein the channel is a main channel or a neighboring channel, the digital signal processor is further is configured to estimate respectively a frequency offset of a pilot signal of the main channel and a frequency offset of the pilot signal of the neighboring channel;

and determine channel spacing between two neighboring channels according to the frequency offset of the pilot signal of the main channel, the frequency offset of the pilot signal of the neighboring channel and a frequency of a pilot signal at a transmitting device.

6. The apparatus for processing according to claim 1, wherein the digital signal processor is further configured to filter the received signal and acquire a filtered signal;

perform frequency shifting on the filtered signal and acquire a frequency-shifted signal;

and calculate the correlation function of the channel by using the frequency-shifted signal and the correlation length.

7. A receiver comprising the apparatus for processing the frequency offset of the pilot signal as claimed in claim 1.

8. A method for processing a frequency offset of a pilot signal, to stabilize spacing of sub-channels and optimize a Wavelength Division Multiplexing (WDM) communication system, in a receiver of a the WDM communication system, and the method comprising:

calculating at least two correlation functions of a channel by using a received signal and at least two correlation lengths, each correlation function corresponds to a correlation length;

calculating at least two phases to which the at least two correlation lengths corresponds according to the at least two correlation, respectively, and when a difference between a neighboring first phase and a second phase in the phases to which the at least two correlation lengths correspond is greater than $\pi$, add $2\pi$ to the second phase to obtain an adjusted second phase; and performing fitting on adjusted phases to which the at least two correlation lengths correspond and calculating a corresponding slope according to a fitting result when the phase to which at least one of the at least two correlation lengths corresponds is greater than $2\pi$, and estimating a frequency offset of the pilot signal of the channel based on the slope.

9. A non-transitory computer readable storage medium for controlling the receiver of a Wavelength Division Multiplexing (WDM) communication system using the method as claimed in claim 8.

* * * * *